Figure 1:
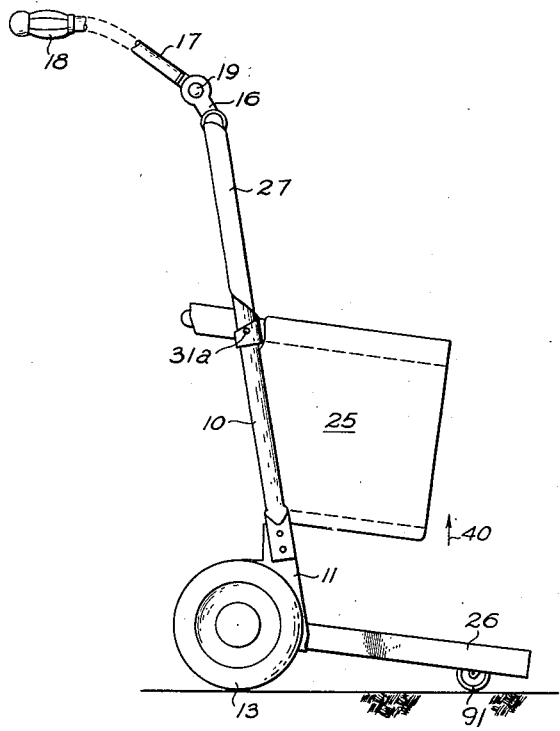

March 26, 1957     A. J. TIMPSON     2,786,692
COLLAPSIBLE CART

Filed Aug. 30, 1954     3 Sheets-Sheet 1

INVENTOR.
Amos Jackson Timpson
BY D. Carl Richards
attorney

March 26, 1957   A. J. TIMPSON   2,786,692
COLLAPSIBLE CART

Filed Aug. 30, 1954   3 Sheets-Sheet 2

INVENTOR.
Amos Jackson Timpson
BY D. Carl Richard
attorney

March 26, 1957
A. J. TIMPSON
COLLAPSIBLE CART
2,786,692
Filed Aug. 30, 1954
3 Sheets-Sheet 3
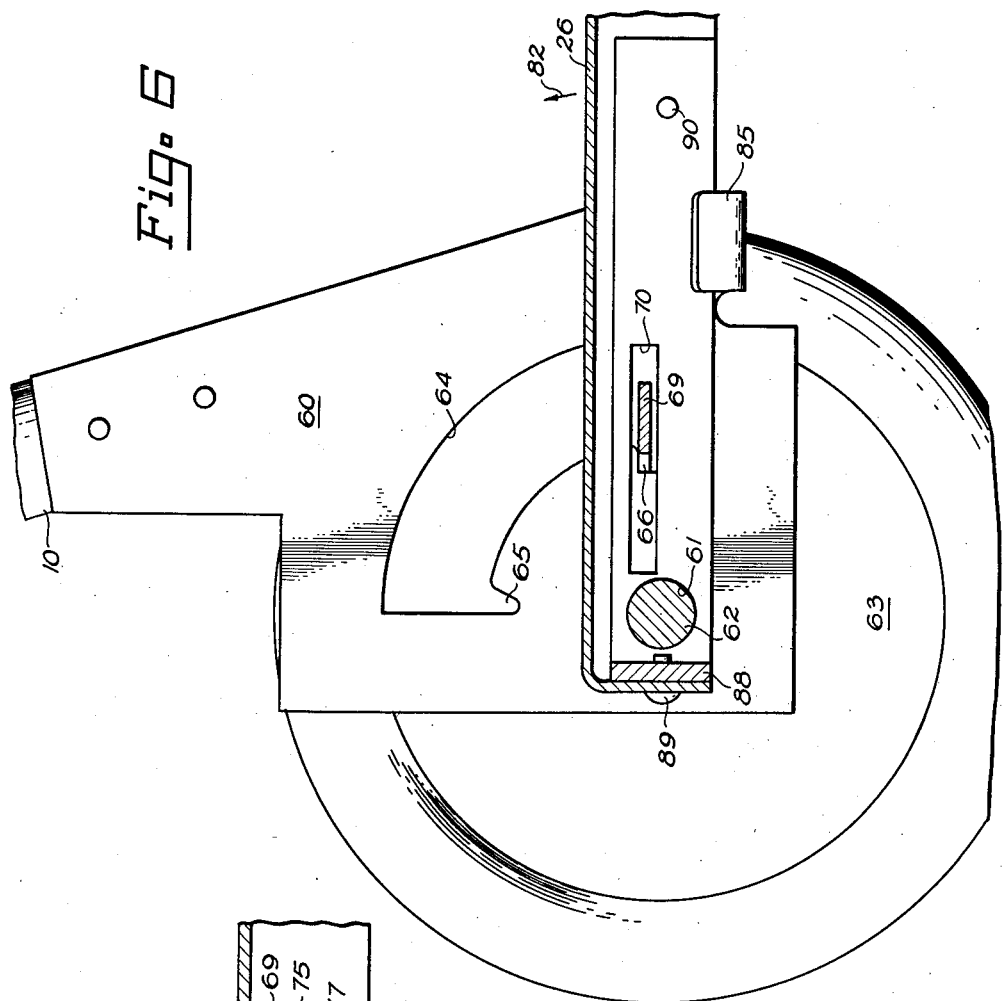
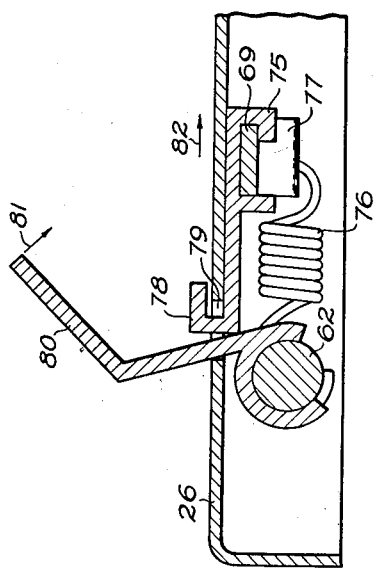
INVENTOR.
Amos Jackson Timpson
BY
D. Carl Richards
attorney United States Patent Office 2,786,692
Patented Mar. 26, 1957

2,786,692

COLLAPSIBLE CART

Amos Jackson Timpson, Dallas, Tex.

Application August 30, 1954, Serial No. 452,858

2 Claims. (Cl. 280—36)

This invention relates to a foldable two-wheeled cart suitable for a plurality of utilitarian purposes, and more particularly to a foldable two-wheeled stroller of relatively simple but rugged construction which may readily be placed in a folded or unfolded condition.

This invention provides a cart, light of weight, sufficiently strong to carry substantial loads, but yet such as to permit reduction of size for transport to and from points of use. While foldable carriages have long been known in the art the present invention provides a new readily fabricated structure which includes the advantages of all the prior systems and yet retains form when folded as to render it convenient for transportation.

In a preferred embodiment the invention comprises a main frame pivotally mounted on a wheel supported axle. A first article supporting means is pivoted on the same axis as the main frame and has a releasable latching bar articulate in and engageable with a cam way in the main frame as to assume one or the other of two positions one of which is a folded position and the other a load-carrying position. A second supporting member is mounted on the main frame above the first supporting member and is latchable in a load-carrying position and is mounted pivotally and slidably to assume a folded position substantially in the plane of and interleaved with the first load-carrying member.

In another aspect, the present invention comprises a wheel-supported main frame with the first load-carrying member latchable substantially perpendicular to the main frame and pivotable into the plane of the main frame. A second load-carrying member is pivotally mounted on the main frame placed above the first load-carrying member and is latchable in the latter position but is slidably and pivotally releasable as to rotate into the plane of the main frame, rotation being in the sense opposite of the rotation of the first load-carrying member. A lever type handle extending from the main frame on the end opposite the first load-carrying member is selectively positionable in each of a plurality of positions as to most conveniently accommodate loads of varying character.

In a more specific aspect the invention comprises an inverted U-shaped tube supported at the extremities thereof by a wheeled axle. An infant seat extends forward from the U-tube and has as a supporting upper rim, a cantilevered U-shape frame pivoted on the U-tube at a point displaced from the ends thereof and latchable at the ends thereon the side of U-tube opposite the infant seat. The upper rim is pivotable into the plane of the U-tube main frame. A footrest is pivotally mounted on said axle and latchable at the extremities of the U-tube in either of two positions, one of which is substantially parallel to the upper rim member and the other substantially parallel to the U-tube.

Figure 2:
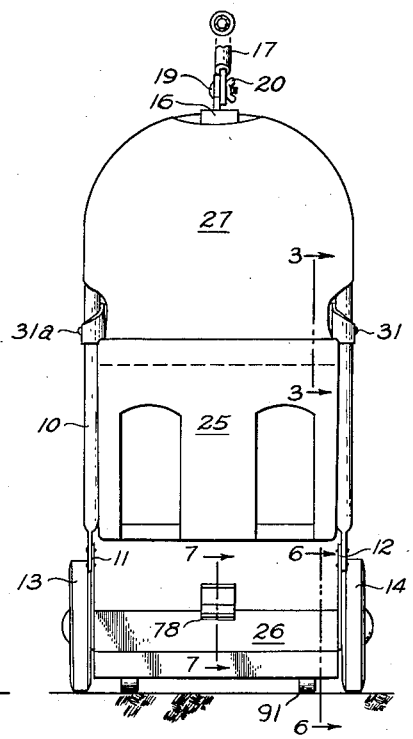
Figure 3:
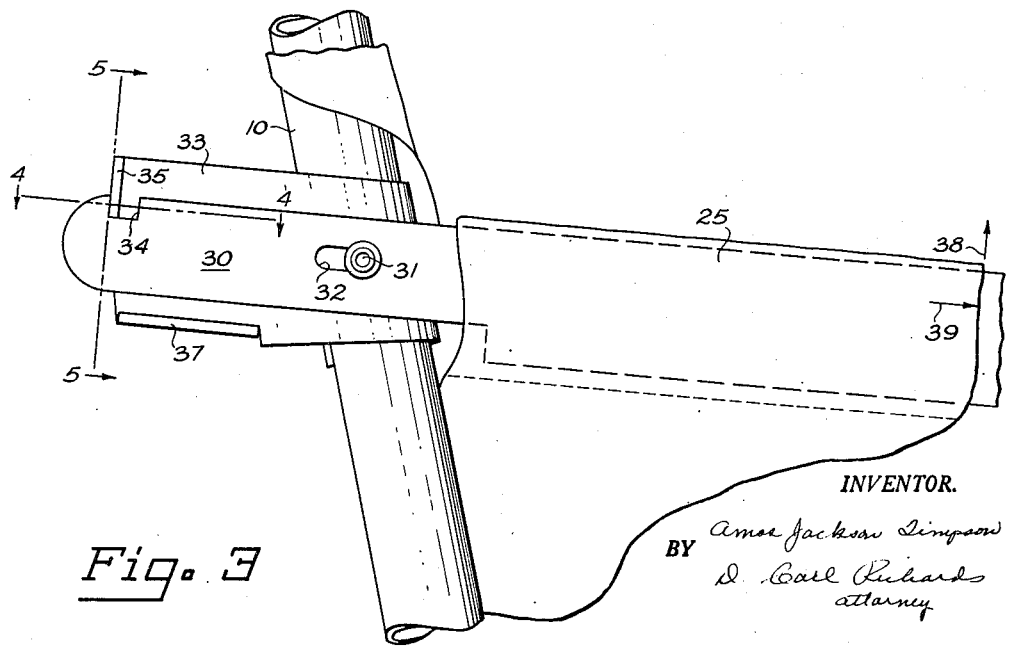
Figure 4:
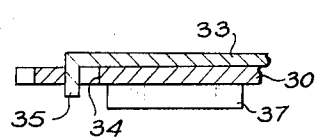
Figures 5, 8:
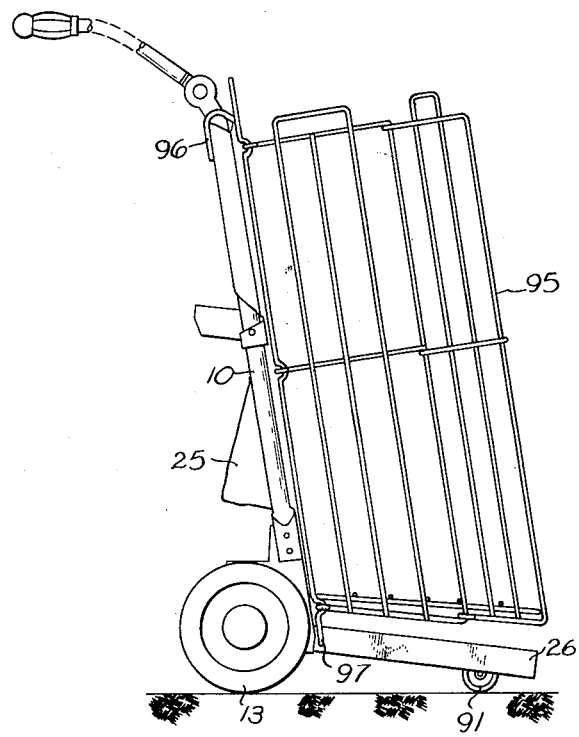

For a more complete understanding of the present invention and for further objects and advantages thereof reference may now be had to the following description taken in conjunction with the accompanying drawings in which:

Fig. 1 is a side view of the foldable cart;
Fig. 2 is a front view of the cart;
Fig. 3 is a fragmentary view taken along the line 3—3 of Fig. 2;
Fig. 4 is a sectional view of a bracket taken along the lines 4—4 of Fig. 3;
Fig. 5 is a sectional view of the bracket taken along the line 5—5 of Fig. 3;
Fig. 6 is an enlarged sectional view of the lower latching structure taken along the line 6—6 of Fig. 2;
Fig. 7 is a sectional view of the release system of the lower latching member taken along the line 7—7 of Fig. 2; and
Fig. 8 is a side view of the cart and a suitable pocket.

Referring now to Figs. 1 and 2 where, for convenience like parts will be given the same reference characters, an inverted tubular U-shaped member 10 is rigidly secured at its lower end to plates 11 and 12 which, in turn, are mounted on a shaft not shown in Figs. 1 and 2 but which supports wheels 13 and 14. A handle bracket 16 is supported on the frame member 10 at the peak thereof. A handle 17 having a grip 18 is pivotally affixed to bracket 16 as by a bolt 19 and wingnut 20. Suitable complementary detent means are provided at the connection between bracket 16 and handle 17 to permit rigid adjustment of handle 17 to any of a plurality of positions angularly different one from the other with bolt 19 as the center of rotation thereof.

While the foldable cart may be found suitable for many purposes it has, for convenience, been here illustrated as adapted to use as an infant stroller and thus includes a fabric seat portion 25 and a footrest 26. An important aspect of the present invention is the provision of relatively simple supporting and latching means which permit rotation of seat 25 and footrest 26 in opposite senses substantially into the plane of frame member 10 so that folded it may be readily transported from one point of use to another.

The fabric seat comprises an inverted pocket 27 fitted over the curvilinear portion of the frame 10 to support the fabric chair section 25. The upper rim of chair 25 comprises a supporting bar best seen in Fig. 3. Bar 30 is threaded through a casing around the upper periphery of the seat 25 and is then slidably and rotatably mounted on a bolt or rivet 31. A slot 32 in bar 30 accommodates bolt 31. Bolt 31 performs the double function of also securing a latching bracket 33 to the frame 10. Bar 30 is provided with a notch 34 along its upper edge near the extremity thereof. The bar 30 when latched in the position shown in Fig. 3 engages a lip 35 on bracket 33. As best shown in Fig. 4 the lip 35 fits in notch 34 to retain bar 30 substantially horizontal as to support chair 25. It should be noted that the lower edge of bracket 33 is turned under bar 30 to prevent rotation thereof in a counterclockwise direction. The turned under portion 37 of bracket 33 is clearly seen in Fig. 5. The seat portion 25 may be folded into the plane of bar 10 by lifting upward on the seat portion for example as indicated by arrow 38 which removes the lip 35 from notch 34. Bar 30 may then be moved forward in the direction of arrow 39 to disengage the latch. The bar 30 may then be allowed to pivot around bolt 31 in a clockwise direction so that it lies parallel with tube 10.

The seat portion 25 as shown in Figs. 1 and 2 may be provided with a stiff bottom as for example by incorporating a heavy pasteboard or plywood mat within the fabric seat mount. When the unit is to be folded the seat board may be rotated counterclockwise in the direction of arrow 40 following which the bar 30 may be unlatched and rotated as above described so that both seat and supporting bar are in the plane of tube 10.

It is to be noted that bracket 33 is mounted on tube 10 by the pivot bolt 31, and is preferably formed from a flat stock rolled as to be snugly complementary to the tube 10. In Figs. 1 and 2 it is clear that bolt 31 and its corresponding bolt 31A extend through the bracket 33 on both sides of tube 10.

From the foregoing, it will be seen that there is provided a relatively simple yet rugged latching mechanism which permits the seat of a baby stroller to be folded into the plane of the utilitarian frame.

Similarly, and as shown in Figs. 6 and 7, the footrest 26 of Figs. 1 and 2 may be folded into the plane of the tubular frame 10. More particularly the lower end of the tubular frame 10 is fixed to a latching plate 60, one of which is shown in the enlarged view of Fig. 6. Plate 60 is provided with a hole 61 to accommodate a shaft 62 which is journaled in wheel 63. The plate 60 is further provided with an arcuate slot or cam way 64 extending through an angle of 90° with the shaft 62 as center of rotation.

The inner edge of way 64 is provided with a radial extension radially directed means such as slots, extensions, or detents 65 and 66. When the extremity of way 64 adjacent to the detent extension 65 is vertical the tubular member 10 slopes at an angle of the order of 15° from vertical, the tube 10 sloping upwards and away from the footrest 26. A latching bar 69 extends across the footrest parallel to shaft 62 with the ends of bar 69 extending into detent recess 65 or 66 and through an elongated slot 70 in the frame of the footrest 26. The latching bar 69 may be positioned in the detent recess 65 or 66 when in a folded or an unfolded position respectively. As best shown in Fig. 7 the bar 69 is secured approximately at its mid-point in a suitable link 75. Link 75 is urged toward the rim of the footrest 26 by a spring 76. One end of spring 76 is secured in a block 77 mounted on the link 75. The other end of the spring 76 encircles shaft 62. Link 75 is provided with a folded end 78 which extends through a rectangular opening 79 in the surface of the footrest 26. While this arrangement is best shown in Fig. 7 the lip of the end 78 may be seen in Fig. 2. A tripping lever 80 is rigidly secured to shaft 62 and extends through the rectangular opening 79 bearing against the end 78 of link 75. When pressed forward in the direction of arrow 81 link 75 moves forward in the direction of arrow 82. This action causes the bar 69, Fig. 6, to move out of the detent extension 66 and permits the footrest 26 to rotate counterclockwise as indicated by arrow 82, Fig. 6, so that the footrest 26 may be moved into or substantially parallel with the plane of the frame of the tubular member 10. When in the latter position bar 69 assumes registration in the detent recess 65. Thus not only may the seat portion be folded but the footrest portion may be locked in either of two positions. It is to be noted that plate 60 is provided with a hook 85 which receives the lower edge of the footrest 26. As shown in Fig. 6 the footrest 26 may comprise a stamping of aluminum sheet metal. The latter stamping may then be provided with a heavy reinforcing bar 88, the same being attached to the downward-turned edges of the footrest 26 as by rivets 89 and 90. The stamping may further be provided with front support means generically represented by the casters 91. While the structure may be made of any suitable metallic stock, light weight coupled with strength are desired characteristics so that aluminum or alloys thereof appear to be most desirable.

Referring now to Fig. 8 a further utilitarian use of the cart has been illustrated. With seat 25 in folded position and footrest 26 in "load carrying position" a wire basket 95 is adapted to be mounted on the U-shaped frame 10. Basket 95 has a pair of hooks, one of which, the hook 96 is shown in Fig. 8, which fit over the top of frame 10. Two extensions, one of which the extension 97 is shown in Fig. 8, engage the sides of the member 26 to position the lower end of the basket 95. Where used in this manner, the basket load is effectively carried by the wheels 13 and casters 91, being transmitted thereto through axle 62 and latching bar 69 (Fig. 6). This and other uses may now become apparent. The cart may be characterized as a foldable sulky suitable for use as a baby stroller, a package carrier, grocery and/or a laundry cart. Other uses may now become apparent.

While the invention has been described in connection with certain specific embodiments thereof, it is to be understood that modifications may now suggest themselves to those skilled in the art and it is intended to cover such modifications as fall within the scope of the appended claims.

What is claimed is:

1. A collapsible utility cart comprising a U-shaped frame, a wheel supported axle, a flat plate secured to the extremity of each arm of said U-shaped frame and mounted on said axle in planes normal thereto and secured to said frame forward of said axle, said plates each being provided with circular ways which extend through substantially 90° with a radial extension at one extremity in a horizontal plane passing through said axle and a radial extension at the other extremity in a vertical plane passing through said axle when said frame is oriented as to tilt backward at a minor angle relative to vertical, a platform pivotally mounted on said axle intermediate the arms of said frame, a latching bar extending through said platform and into said ways on either side of said platform, resilient means for urging said latching bar toward said axle and into said radial extensions, whereby said platform may be latched in either of two positions oriented 90° from each other where in one such position said platform is interleaved as to be approximately parallel with said frame.

2. A collapsible cart comprising an axle and two wheels mounted at the ends, thereof, a U-shaped frame pivoted on said axle with the axis of said frame displaced forward of said axle, a first load-carrying member pivotally mounted at one edge thereof on said axle and extending therefrom, latching means for securing said platform to said main frame in either of two positions and in one of which said platform is interleaved with the main frame, a second load-carrying member, comprising a U-shaped frame slidably and rotatably mounted at a point intermediate the ends of the first U-shaped frame and intermediate the ends of the second U-shaped frame for fixing said second load-carrying member to said main frame in either of two positions one of which is interleaved with said frame and the other substantially 90° therefrom and extending forward and above said first load-carrying member.

References Cited in the file of this patent
UNITED STATES PATENTS

| | | |
|---|---|---|
| 255,781 | Graeser | Apr. 4, 1882 |
| 1,846,548 | Ganoung | Feb. 23, 1932 |
| 2,422,862 | Stottrup | June 24, 1947 |
| 2,582,435 | Howard | Jan. 15, 1952 |